(12) United States Patent
Shin et al.

(10) Patent No.: US 8,861,911 B2
(45) Date of Patent: Oct. 14, 2014

(54) COMPOSITE CABLE FOR TRANSMITTING OPTICAL SIGNALS AND SUPPLYING ELECTRIC POWER

(75) Inventors: Hyung-Soo Shin, Seoul (KR); Lae-Hyuk Park, Seoul (KR); Ki-Yeul Kim, Seoul (KR); Hyoung-Koog Lee, Gwangmyeong-si (KR); Tae-Kyung Yook, Cheongju-si (KR); Joong-Kwan Kim, Suwon-si (KR)

(73) Assignee: LS Cable & System Ltd., Anyang, Gyeonggi-do (KR)

( * ) Notice: Subject to any disclaimer, the term of this patent is extended or adjusted under 35 U.S.C. 154(b) by 65 days.

(21) Appl. No.: 13/697,880

(22) PCT Filed: May 16, 2011

(86) PCT No.: PCT/KR2011/003599
§ 371 (c)(1),
(2), (4) Date: Dec. 4, 2012

(87) PCT Pub. No.: WO2011/142642
PCT Pub. Date: Nov. 17, 2011

(65) Prior Publication Data
US 2013/0077924 A1    Mar. 28, 2013

(30) Foreign Application Priority Data
May 14, 2010 (KR) .......................... 10-2010-0045564

(51) Int. Cl.
*G02B 6/44* (2006.01)
*H01B 9/00* (2006.01)

(52) U.S. Cl.
CPC .............. *G02B 6/4401* (2013.01); *G02B 6/443* (2013.01); *G02B 6/4416* (2013.01); *H01B 9/005* (2013.01)
USPC .......................................... 385/101; 385/147

(58) Field of Classification Search
CPC ........................................................ G02B 6/00
USPC ........................................ 385/100–108, 147
See application file for complete search history.

(56) References Cited

U.S. PATENT DOCUMENTS

| | | | |
|---|---|---|---|
| 5,230,034 A * | 7/1993 | Bottoms et al. | 385/113 |
| 5,325,457 A * | 6/1994 | Bottoms et al. | 385/113 |
| 5,857,494 A * | 1/1999 | Tsukamoto et al. | 138/140 |
| 6,215,931 B1 * | 4/2001 | Risch et al. | 385/109 |
| 6,249,628 B1 * | 6/2001 | Rutterman et al. | 385/106 |
| 7,050,688 B2 * | 5/2006 | Lochkovic et al. | 385/128 |
| 7,092,605 B2 * | 8/2006 | Adams et al. | 385/113 |
| 7,310,430 B1 * | 12/2007 | Mallya et al. | 382/101 |

* cited by examiner

*Primary Examiner* — Akm Enayet Ullah
(74) *Attorney, Agent, or Firm* — Sherr & Jiang, PLLC

(57) ABSTRACT

An optical and power composite cable includes a plurality of power lines adjacently arranged in a cable, each power line having a central conductor and an insulating coating layer surrounding the central conductor; at least one optical fiber unit arranged together with the power lines, each optical fiber unit having at least one optical fiber and a tube surrounding the optical fiber; and a cable sheath surrounding the power lines and the optical fiber unit, wherein, assuming that the thickness of the tube is t and that the outer diameter of the tube is D, the ratio of the thickness of the tube to the outer diameter defined as t/D is 8% to 20%.

7 Claims, 2 Drawing Sheets

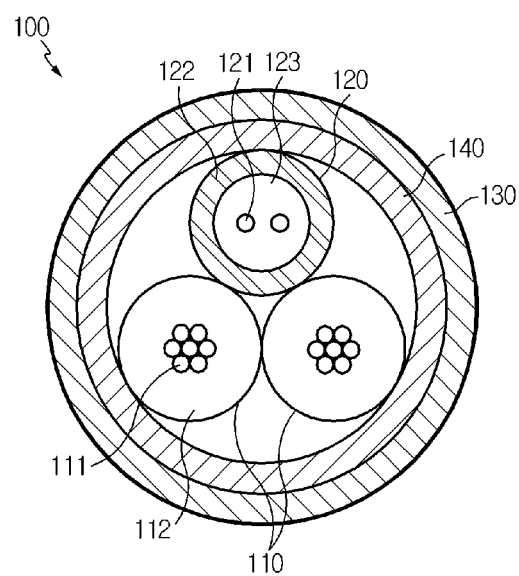

COMPOSITE CABLE FOR TRANSMITTING OPTICAL SIGNALS AND SUPPLYING ELECTRIC POWER

TECHNICAL FIELD

The present invention relates to a composite cable for transmitting optical signals and supplying electric power, and more particularly, to an optical and power composite cable having improved durability against the heat generated from a power cable to ensure convenient production and efficient utilization of material.

BACKGROUND ART

Cross-Reference to Related Application

This application claims priority to Korean Patent Application No. 10-2010-0045564 filed in the Republic of Korea on May 14, 2010, the entire contents of which are incorporated herein by reference.

Generally, an optical cable for communication and a power cable for power transmission are independently installed and managed. However, in a system where an optical cable is diverged to a plurality of optical network units (ONUs) to feed electricity thereto, for example an FTTC (Fiber To The Curb) network and an RRH (Remote Radio Head), a cable that has both an optical signal transmitting function and a power supplying function is demanded.

FIG. 1 shows an example of a conventional composite cable. The cable of FIG. 1 has a central tube structure having an optical fiber unit located at a central location and a copper wire aggregate located outside of the optical fiber unit which is formed within a single sheath 17. Referring to FIG. 1, the optical fiber unit has at least one optical fiber 10 and a filler 11 in a buffer tube 12. The copper wire aggregate has single-core copper wires 13, each having a coating 14. The single-core copper wires 13 surround the optical fiber unit. Additionally, an external tension wire 16 surrounding the copper wire aggregate is further included. In addition, in a case where the copper wire aggregate is formed in multi layers, a waterproof tape 15 may be further provided to surround each layer of the copper wire aggregate.

FIG. 2 shows another example of a composite cable having a central tube structure. In this cable, copper wire pairs are aggregated to surround an optical fiber unit at a central location. At this time, a waterproof yarn 18 may be further included in the copper wire aggregate.

The central tube structure having the optical fiber unit arranged at the center as mentioned above may protect the optical fiber unit from the heat generated from the copper wires since the single-core copper wires 13 are separated from each other. However, since the single-core copper wires 13, each having the coating 14, are aggregated, material is unnecessarily consumed for the coating of every copper wire. In addition, since the volume of the cable is increased, it is not easy to handle or install the cable.

FIG. 3 shows another example of a conventional composite cable. The cable shown in FIG. 3 is a loose tube cable.

In this structure, a plurality of optical fiber units, each having at least one optical fiber 10 and a buffer tube 12 surrounding the optical fiber 10, are disposed at the outer periphery of a rigid portion 19b to configure a loose tube L. In addition, copper wires 13, each having a coating 14, are aggregated to configure a copper wire unit. The loose tube L and the copper wire unit are aggregated around a central tension wire 19a.

The loose tube composite cable is also configured to decrease the influence of the heat generated from the copper wires 13 on the optical fiber unit. However, since this composite cable additionally has the central tension wire 19a and the rigid portion 19b in order to give a tensile strength to the inside of the loose tube L and to the entire cable, the entire outer diameter of the composite cable is overly increased. For this reason, the composite cable can have a limited number of optical fiber units and a limited number of copper wires within the sheath 17. In addition, many kinds of materials are required for producing a cable. For this reason, there is a problem of not being able to easily handle a produced cable and the increase in production costs.

DISCLOSURE OF INVENTION

Technical Problem

The present invention is designed to solve the problems of the prior art, and therefore it is an object of the present invention to provide an optical and power composite cable having a structure that is capable of ensuring convenient production and efficient utilization of material and that is also capable of keeping durability against the heat generated from a power cable.

Solution to Problem

In one aspect, the present invention provides an optical and power composite cable, which includes a plurality of power lines adjacently arranged in a cable, each power line having a central conductor and an insulating coating layer surrounding the central conductor; at least one optical fiber unit arranged together with the power lines, each optical fiber unit having at least one optical fiber and a tube surrounding the optical fiber; and a cable sheath surrounding the power lines and the optical fiber unit, wherein, assuming that the thickness of the tube is t and that the outer diameter of the tube is D, the ratio of the thickness of the tube to the outer diameter defined as t/D is 8% to 20%.

Preferably, the tube has a tensile strength of 0.08 kgf/mm$^2$ to 3 kgf/mm$^2$.

Preferably, the tube has an elongation of 375% to 600%.

Preferably, the optical fiber unit has a loose tube structure.

Preferably, the tube is made of a polyethylene resin, a polypropylene resin or a polyvinyl chloride (PVC) resin.

Preferably, the central conductor of the power line is formed by twisting several metal strands at regular pitches.

Preferably, the optical and power composite cable further includes a braided shielding layer formed between the power lines and the cable sheath and between the optical fiber unit and the cable sheath.

Advantageous Effects of Invention

According to the present invention, since the optical fiber unit and the power cable may be formed with the same structure and arranged together, the composite cable may be produced more conveniently and the material may be utilized more efficiently. In addition, since the durability against the heat generated from the power cable is improved to minimize the influence of side pressure on an optical fiber, the transmission loss of optical communication may be minimized.

BRIEF DESCRIPTION OF DRAWINGS

Other objects and aspects of the present invention will become apparent from the following description of the embodiments with reference to the accompanying drawings in which:

FIG. 4 is a sectional view showing an optical and power composite cable according to a preferred embodiment of the present invention.

BEST MODE FOR CARRYING OUT THE INVENTION

Figure 1:
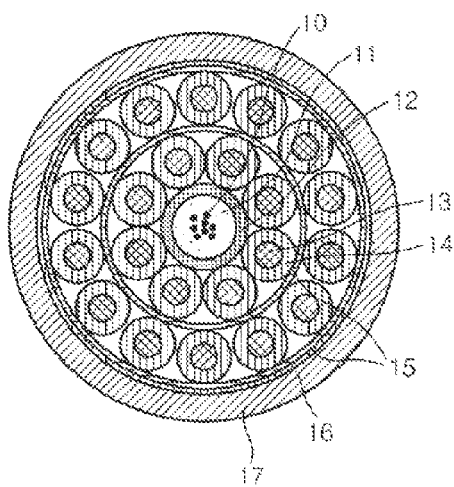
FIG. 1 is a sectional view showing an example of a conventional composite cable.
Figure 2:
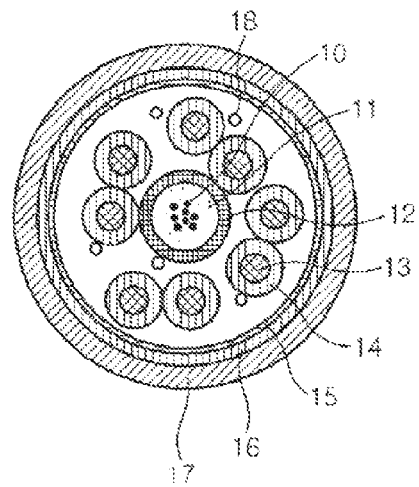
FIG. 2 is a sectional view showing another example of a conventional composite cable.
Figure 3:
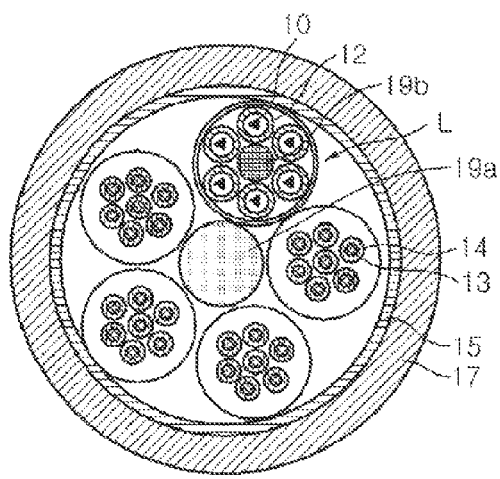
FIG. 3 is a sectional view showing still another example of a conventional composite cable.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 4 is a sectional view showing an optical and power composite cable according to a preferred embodiment of the present invention.

Referring to FIG. 4, the optical and power composite cable 100 according to the present invention includes a plurality of power lines 110 adjacently arranged, an optical fiber unit 120 arranged together with the power lines 110, and a cable sheath 130 surrounding the power lines 110 and the optical fiber unit 120.

The power line 110 includes a central conductor 111 made of conductive conductor and an insulating coating layer 112 surrounding the central conductor 111. The power line 110 is preferably designed in accordance with the standards for general power purposes.

The central conductor 111 has a composite stranded wire structure in which a plurality of metal strands are twisted at regular intervals. The metal strand is made of a single metal or an alloy of at least two metals. In other words, the metal strand is made of any metal selected from the group consisting of copper, aluminum, steel and nickel, or their alloys.

In addition, the insulating coating layer 112 is an insulating polymer resin layer extruded to the outer periphery of the central conductor 111 and is made of polyethylene, polypropylene or polyvinyl chloride (PVC).

The optical fiber unit 120 may have any shape including an optical fiber for transmitting optical signals. Preferably, the optical fiber unit 120 has a loose tube structure including at least one optical fiber 121 and a tube 122 surrounding the optical fiber 121. Additionally, the tube 122 may be filled with a filler 123 such as jelly compound. In addition, the material of the tube 122 may be polyethylene, polypropylene or polyvinyl chloride (PVC).

In the present invention, the characteristics of the tube 122 in the optical fiber unit 120 of the optical and power composite cable 100 are improved to enhance the durability of the optical fiber unit 120 against the heat generated at the power lines 110 so that the influence caused by the side pressure applied to the optical fiber 121 may be minimized. In this way, the present invention minimizes transmission losses in the optical transmission.

In detail, assuming that the thickness of the tube is t and that the outer diameter of the tube is D, the ratio of the thickness of the tube to the outer diameter defined as t/D is preferably 8% to 20%. At this time, as for the ratio of the thickness to the outer diameter of the tube, if the ratio is smaller than 8%, the tube may be easily crushed by a stress applied from the outside or deformed by heat since its thickness is too small. If the ratio is greater than 20%, though the mechanical strength is increased as the thickness is greater, the space to be filled with the filler 123 is narrowed due to the great thickness, and a gap between the optical fiber and the wall of the tube is decreased so that the optical fiber contacts the wall, which may increase a long-wavelength loss caused by micro bending.

In addition, it is preferable that the tube 122 of the optical fiber unit 120 has a tensile strength of 0.08 kgf/mm² to 3 kgf/mm². At this time, as for the tensile strength of the tube, if the tensile strength is smaller than 0.08 kgf/mm², the tube may be deformed by an external impact or heat since its strength is too weak, and thus the tube cannot protect the optical fiber sufficiently. If the tensile strength is greater than 3 kgf/mm², when a bending test is performed for the cable, the tube may stay crushed without restoring its original shape since its rigidity is too high.

In addition, it is preferable that the tube 122 of the optical fiber unit 120 has an elongation of 375% to 600%. At this time, as for the elongation, if the elongation is smaller than 375%, the tube may stay crushed without restoring to its original shape when the cable is bent or when an external impact is applied to the cable. If the elongation is greater than 600%, the tube may be easily deformed by an external force since its material is too flexible, and thus an external impact may be directly transmitted to the optical fiber, which may disconnect the optical fiber.

In the present invention, the power lines and the optical fiber unit 120 have the same shape and are arranged together by means of the tube 122 with the above conditions. Therefore, a composite cable may be produced more conveniently, and its materials may be used more efficiently.

The cable sheath 130 is provided to surround the power lines 110 and the optical fiber unit 120, and the cable sheath 130 is made of polyethylene, polypropylene or polyvinyl chloride (PVC). The cable sheath 130 may have a circular shape as shown in FIG. 4.

Additionally, a tube or a braided shielding layer 140 is additionally formed between the cable sheath 130 and the aggregate of the power lines 110 and the optical fiber unit 120 so as to prevent an external moisture from penetrating into the cable or to isolate an electromagnetic field generated in the central conductor 111 of the power line 110 from the outside.

Now, operations of the optical and power composite cable according to the present invention, configured as above, will be described.

The optical and power composite cable of the present invention includes a plurality of power lines 110 and an optical fiber unit 120 together so that optical signals and power are transmitted complicatedly.

Therefore, when the optical and power composite cable of the present invention is applied to an RRH (Remote Radio Head) system, optical fibers for communication and cables for feeding electricity may be cabled together, conveniently. In addition, Brillouin scattering characteristic may be used to monitor a cable installation region, such as detecting temperature or stress in the cable installation region, by means of the optical fiber used for communication.

Preferable examples (Examples 1 to 3) of the optical and power composite cable according to the present invention and comparative examples (Comparative Examples 1 to 3) were prepared to respectively have a ratio of thickness to the outer diameter of the tube, a tensile strength and an elongation as shown in the following Table 1. After that, temperature, impact, horizontal tension, compression, successive bending and cable twisting were evaluated. The evaluation results are classified into good and bad, as shown in Table 1.

Test pieces of an optical and power composite cable were prepared according to Examples 1 to 3 and Comparative Examples 1 to 3, and the test pieces were evaluated in accordance with the Telcordia GR-20-CORE standards which is a representative standard commonly used in the art.

TABLE 1

| | Ratio of thickness to outer diameter of the tube (%) | Tensile Strength (kgf/mm$^2$) | Elongation (%) | Representative bad characteristic | Final Evaluation |
|---|---|---|---|---|---|
| Example 1 | 8.0 | 0.08 | 375.0 | None | Good |
| Example 2 | 20.0 | 3.00 | 600.0 | None | Good |
| Example 3 | 10.0 | 1.50 | 400.0 | None | Good |
| Comparative Example 1 | 22.0 | 1.50 | 400.0 | Horizontal Tension | Bad |
| Comparative Example 2 | 7.0 | 1.50 | 400.0 | Compression | Bad |
| Comparative Example 3 | 10.0 | 3.10 | 400.0 | Successive Bending, Cable Twisting | Bad |
| Comparative Example 4 | 10.0 | 0.07 | 400.0 | Temperature, Impact | Bad |
| Comparative Example 5 | 10.0 | 1.50 | 610.0 | Successive Bending | Bad |
| Comparative Example 6 | 10.0 | 1.50 | 370.0 | Impact, Cable Twisting | Bad |

Seeing Table 1, Examples 1 to 3 of the present invention has a ratio of thickness to outer diameter of the tube which is 8% to 20%, a tensile strength of 0.08 kgf/mm$^2$ to 3 kgf/mm$^2$, and an elongation of 375% to 600%. Therefore, it would be understood that Examples 1 to 3 of the present invention are evaluated to be good in all of the temperature, impact, horizontal tension, compression, successive bending and cable twisting tests.

Meanwhile, in the case of Comparative Example 1 where the ratio of thickness to outer diameter of the tube is greater than 20%, the horizontal tension test was evaluated to be bad. In the case of Comparative Example 2 where the ratio of thickness to outer diameter of the tube is less than 8%, the compression test was evaluated to be bad. From the above, it could be found that the ratio of thickness to outer diameter of the tube should be within the range of 8% to 20%.

In addition, in the case of Comparative Example 3 where the tensile strength is greater than 3 kgf/mm$^2$, the successive bending test and the cable twisting test were evaluated to be bad. In the case of Comparative Example 4 where the tensile strength is less than 0.08 kgf/mm$^2$, the temperature test and the impact test were evaluated to be bad. From the above, it could be found that the tensile strength should be within the range of 0.08 kgf/mm$^2$ to 3 kgf/mm$^2$.

Moreover, in the case of Comparative Example 5 where the elongation is greater than 600%, the successive bending test was evaluated to be bad. In the case of Comparative Example 6 where the elongation is smaller than 375%, the impact test and the cable twisting test were evaluated to be bad. From the above, it could be found that the elongation should be within the range of 375% and 600%.

As described above, the performance of an optical and power composite cable may be improved by optimizing a ratio of thickness to outer diameter of a tube of the optical and power composite cable, a tensile strength and an elongation.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, the optical fiber unit and the power lines may be formed with the same shape and arranged together to improve the convenience for producing a composite cable and the efficiency for using materials. In addition, since the durability against the heat generated from the power lines may be improved to minimize an influence caused by a side pressure applied to the optical fiber, the transmission loss in optical transmission may be minimized.

The invention claimed is:

1. An optical and power composite cable, comprising:
   a plurality of power lines adjacently arranged in a cable, each power line having a central conductor and an insulating coating layer surrounding the central conductor;
   at least one optical fiber unit, each having at least one optical fiber and a tube surrounding the optical fiber; and
   a circular cable sheath surrounding the plurality of power lines and the at least one optical fiber unit,
   wherein the plurality of power lines and the at least one optical fiber unit are arranged together in the circular cable sheath, and
   wherein, assuming that thickness of the tube is t and the outer diameter of the tube is D, a ratio of the thickness of the tube to the outer diameter defined as t/D is 8% to 20%.

2. The optical and power composite cable according to claim 1, wherein the tube has a tensile strength of 0.08 kgf/mm$^2$ to 3.0 kgf/mm$^2$.

3. The optical and power composite cable according to claim 1, wherein the tube has an elongation of 375% to 600%.

4. The optical and power composite cable according to claim 1, wherein the optical fiber unit has a loose tube structure.

5. The optical and power composite cable according to claim 1, wherein the tube is made of a polyethylene resin, a polypropylene resin or a polyvinyl chloride (PVC) resin.

6. The optical and power composite cable according to claim 1, wherein the central conductor of the power line is formed by twisting several metal strands at regular pitches.

7. The optical and power composite cable according to claim 1, further comprising a braided shielding layer formed between the power lines and the cable sheath and between the optical fiber unit and the cable sheath.

* * * * *